E. A. SPERRY.
GYROSCOPIC ROLL AND PITCH RECORD.
APPLICATION FILED NOV. 24, 1916.

1,399,032.

Patented Dec. 6, 1921.
3 SHEETS—SHEET 1.

INVENTOR
ELMER A. SPERRY.

BY
Herbert H. Thompson,
ATTORNEY

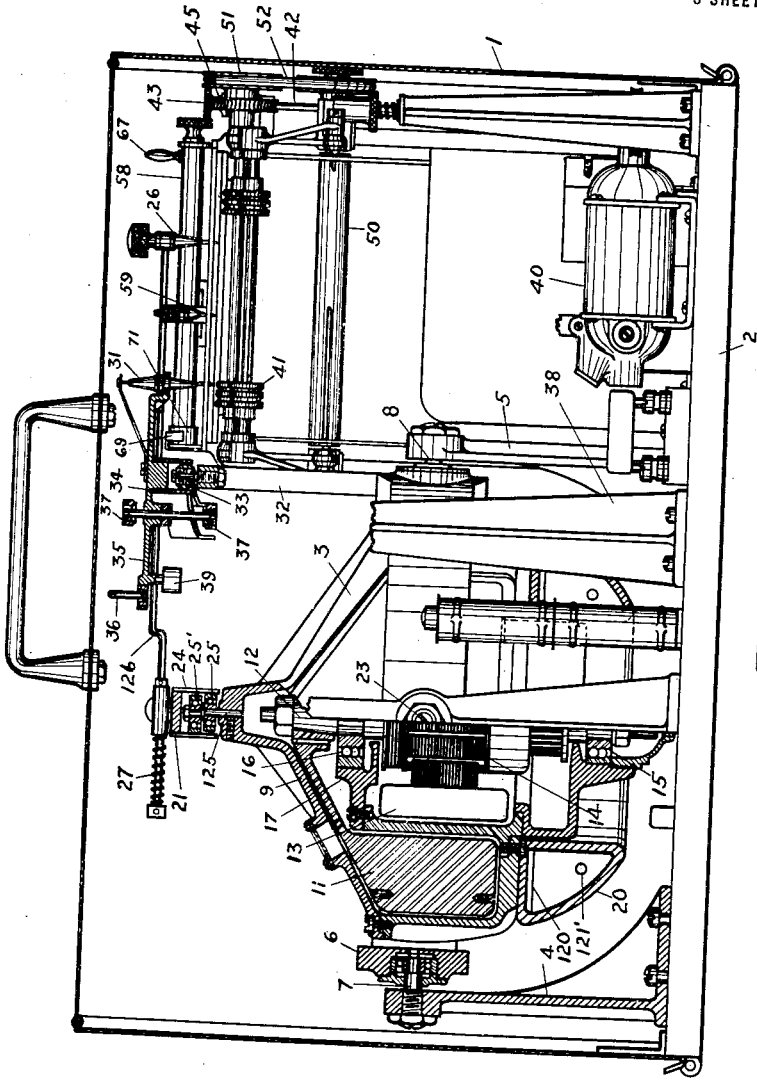

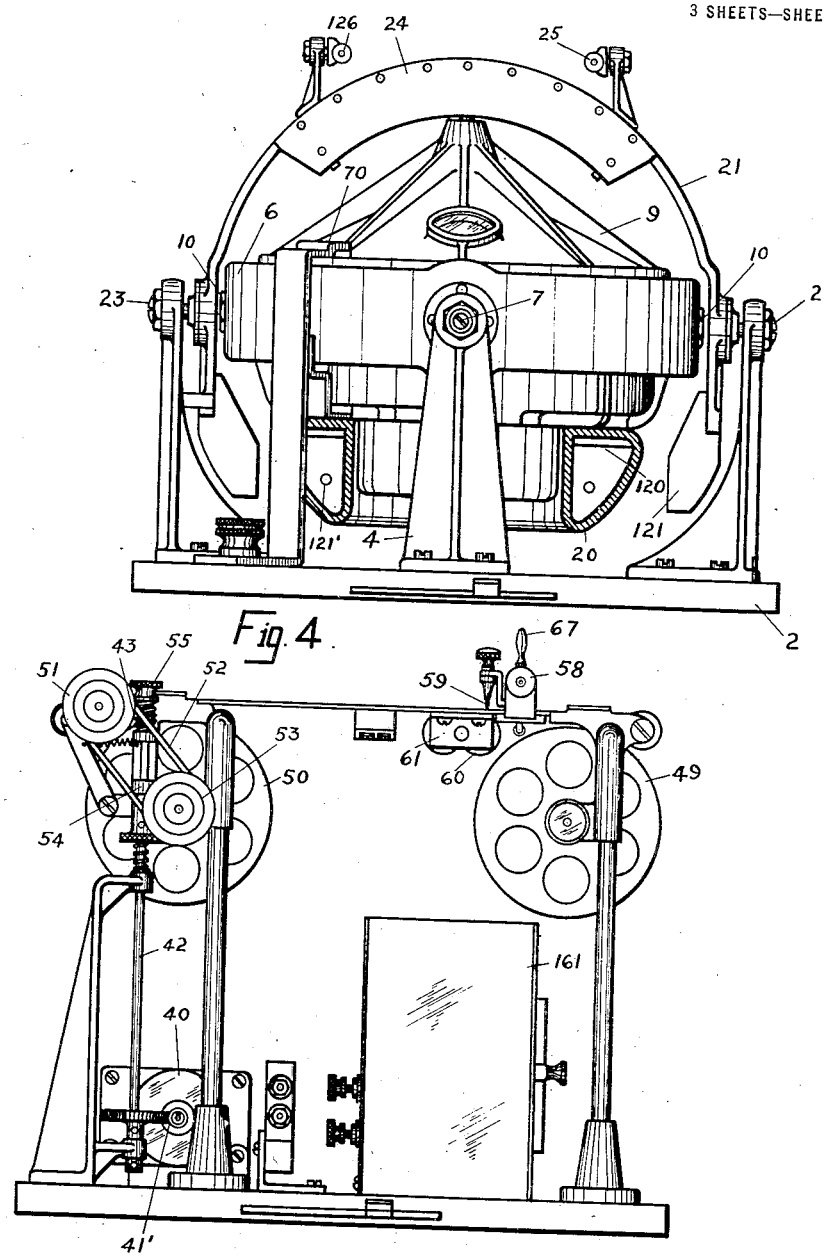

UNITED STATES PATENT OFFICE.

ELMER A. SPERRY, OF BROOKLYN, NEW YORK, ASSIGNOR TO SPERRY GYROSCOPE COMPANY, A CORPORATION OF NEW YORK.

GYROSCOPIC ROLL AND PITCH RECORD.

1,399,032.  Specification of Letters Patent.  Patented Dec. 6, 1921.

Application filed November 24, 1916. Serial No. 133,230.

*To all whom it may concern:*

Be it known that I, ELMER A. SPERRY, a citizen of the United States, residing at 1505 Albermarle road, Brooklyn, in the county of Kings and State of New York, have invented certain new and useful Improvements in Gyroscopic Roll and Pitch Records, of which the following is a specification.

This invention relates to means for making a record of the oscillations of bodies in one or more planes. It is especially adapted for recording preferably both the roll and pitch of a ship. It is often found very desirable to obtain an accurate indication of the period and amplitude of roll or pitch of a ship, especially where it is desired to stabilize the ship against rolling by gyroscopes. It is also found desirable to employ such a recording means to study the effect of stabilizing gyroscopes on a ship by comparing the roll when the gyroscopes are in action and when they are shut off.

According to this invention I provide a means for recording on a single chart both the roll and the pitch of the ship in continuous lines.

Figure 1:
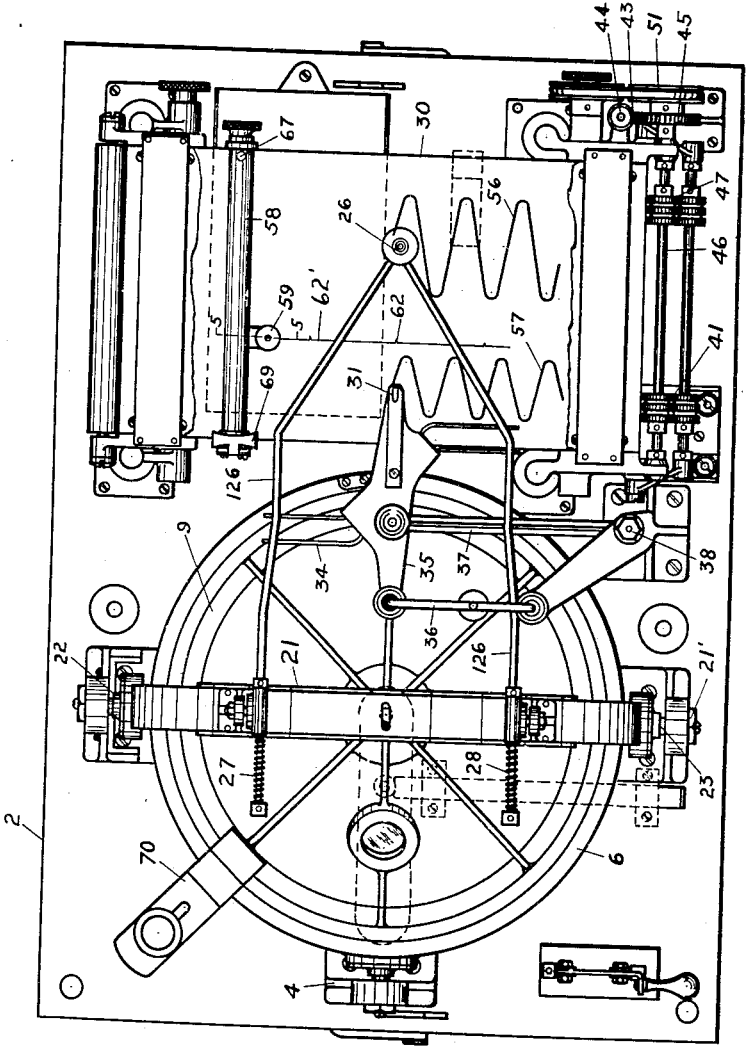
Figure 7:
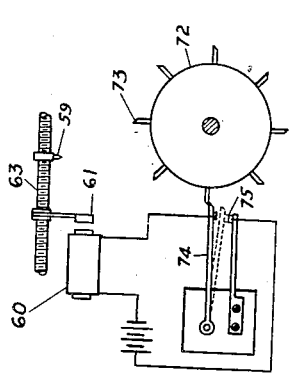
Figure 8:
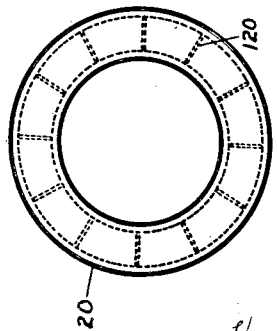

Referring to the drawings in which what I now consider to be the preferred form of my invention is shown: Figure 1 is a plan view of a recorder designed according to my invention. Fig. 2 is a side elevation of the same, partly in section. Fig. 3 is an end elevation of the mechanical means for actuating the recording sheet. Fig. 4 is an end elevation of the gyroscope. Fig. 5 is a cross section of the time indicating means, the section being taken on line 5—5, Fig. 1. Fig. 6 is a longitudinal section of the same. Fig. 7 is a diagrammatic view of the contact on the clock for actuating said means. Fig. 8 is a detail showing damping means for the gyroscope.

The recording instrument is shown in Fig. 2 as a portable device inclosed within a removable casing 1, which rests upon the base 2. The instrument comprises essentially a gyroscope 3, and recording means attached in part to said gyroscope and in part to some other portion of the apparatus.

The gyroscope is shown as mounted for three degrees of freedom, being supported from supports 4 and 5 within a gimbal ring 6. Said ring is pivoted on said supports on pivots 7 and 8, while the rotor bearing frame 9 of the gyroscope is pivoted within said ring on pivots 10 extending preferably at right angles to said pivots 7 and 8. The spinning axis of the gyroscope is at an angle to both said other axes and is preferably vertical.

The gyroscopic rotor comprises a flywheel 11 attached to a vertical shaft 12 and extending back over the field 13 of the electric motor which drives and forms a part of the gyroscope. Said shaft 12 also carries the armature 14 of said motor and is journaled on thrust bearing 15 near the bottom of the frame 9 and an upper bearing 16, which is preferably placed between the upper end 17 of the field and the shaft, but within or below the rotor.

The gyroscope is preferably pendulous about both horizontal axes and may have a weight 20 attached thereto for this purpose. The pendulous factor of the gyroscope is so designed that the gyroscopic pendulum has a very long period, many times the period of roll of the ship, so that it will be practically unaffected by the oscillation of the latter.

Damping means may also be secured to the gyroscope. Preferably this means is in the form of containing means 20 for a liquid which is also shown as serving as a weight, as explained. Said means is preferably constructed so that the liquid may flow from one side of the center of the gyroscope to the other as the gyroscope oscillates, the flow of the liquid, however, being restricted or slowed down by any suitable means so that the torques exerted on the gyroscope by the liquid will be out of phase with the oscillation of the gyroscope thereby exerting a powerful damping effect. As shown, the containing means is in the form of an annular container 20 extending circumferentially around the bottom of the gyroscope casing 9 and secured thereto so that the liquid may readily flow from one part of the container to the other when the gyroscope becomes inclined. Blades 120 are secured within the container, which stop short of its roof so that the liquid may flow over their tops. They may also be provided with small, apertures 121'. Such a device will act to damp powerfully oscillations of the gyroscope, since the small apertures will restrict the flow of the liquid from one part of the casing to another to effect the above described purpose. The gyroscope is also preferably provided with stops or locking means such as clamp 70, so that it may be readily brought back to any desired position by suppressing the precession; that is, by applying forces about both principal axes at once.

Pivoted in line with axis 10, 10 on pivots 22, 23 is a loop 21 which may be counterbalanced as by weights 121. Said loop is provided with a track or guideway 24, within which one or more rollers 25, 25', journaled on pin 125 in the top of casing 9 are guided. The two rollers are mounted slightly eccentrically so that each roller will touch only one side of the track. Also by adjusting pin 125, the eccentricity of the rollers may be varied to take up the wear in the track. In this construction it will be seen that the loop 21 will partake of only the apparent oscillations of the gyroscope about axis 10, 10, but will be unaffected about axes 7, 8. Secured to said loop is a frame work 126 which carries a recording means or marker 26, such as a stylus or pencil. The said frame work 126 is preferably yieldingly connected with the loop as by means of springs 27, 28 so that an accidental catching of the stylus will not break the machine or disturb the sensitive gyroscope.

While it is immaterial in which position the instrument is placed on the ship, for the purpose of this description the stylus 26 may be considered a roll recorder; in other words, the instrument is assumed to be placed with the axis 22—23 of loop 21 extending in a fore and aft direction. Stylus 26 moves over a continuously moved surface of paper, soft wax or the like.

According to this invention, I also prefer to provide means whereby the pitch recording stylus 31 also moves over said surface 30. For this purpose an upward extending arm 32 may be secured to ring 6. On said arm is mounted a small roller 33 which is guided within or between a track 34 secured to the member 35. Track 34 throughout the middle portion of its length is inclined at an angle to the major axes of the gyroscope so that when the roller is apparently moved out from or into the plane of the paper in Fig. 2, the track will be moved at a substantially right angle to said movement and will impart a movement to member 35 transverse to the sheet 30. Member 35 also bears said stylus 31 and is supported by a pair of links 36, 37 pivoted to a bracket 38 and designed to constrain the movements of member 35, to rectilinear motion. A balance weight 39 may be secured to link 36 if desired. The recording surface is continuously driven by means of a small motor 40 which is geared to the serrated feed rollers 41 between which the surface is drawn by means of worm gears 41', shaft 42 and worm gears 43. The worm 44 of said last set of worm gears is mounted on shaft 42 while the worm wheel 45 is shown as mounted on the shaft 46 supporting the inner set 47 of feed rollers. The surface is wound from one drum 49 to another 50 in the usual manner, the latter drum being rotated on shaft 46 by means of a pulley 51 on said shaft, a loose belt 52 and a pulley 53 on the shaft of drum 50. A clutch 54 may be provided on shaft 42 so that the motor may be disconnected and the paper fed by turning thumb piece 55 if desired. As the paper is driven by the motors and the ship rolls and pitches, records such as lines 56 and 57 are made on the sheet.

I also prefer to provide means for indicating the period of roll and pitch. For this purpose I may provide a member 58 within which is a threaded rod 63, which supports a stylus 59. Secured underneath the frame work is an electromagnet 60 designed to attract armature 61 secured to rod 63 through arms 64 so as to impart a small lateral movement to the stylus, by moving rod 63 against the pressure of spring 65 which returns the rod and stylus to their normal position as soon as armature 61 is released. Magnet 60 is in circuit with a clock 161 or the like. The clock is designed to complete a circuit through said magnet periodically. Wheel 72 Fig. 7 is revolved by clock 161. Upon said wheel are arranged pins 73 at predetermined intervals. These pins coming into contact, with arm 74, press said arm into the dotted line position so as to form the electrical contact at 75, thus completing the circuit in magnet 60. The distance between wheel 72 and arm 74 is so adjusted that the pins 73 will slip off from the end of said arm the moment that the electrical contact is completed, or a fraction of a second thereafter, thus permitting the stylus to return promptly to its normal position. It will readily be seen, therefore, that stylus 59 will record time indications 62 on said sheet from which the period of roll can be readily estimated. Line 62' may be traced along any desired part of the recording paper, by moving the stylus laterally along rod 63. This may be done by turning knob 66 which is part of said rod. The pressure of the stylus upon the paper may be regulated by turning to one side or the other handle 67 which is securely fastened to member 58. This rotates member 58, thus increasing or decreasing the pressure on spring 68. Member 58 is held in the desired position by clutches 69 bearing upon the knurled ring 71 which is securely attached around member 58.

The operation of my device is as follows:
In explaining the action of recording styli they have been described as moved by the apparent oscillation of the gyroscope. Of course, strictly speaking, the gyroscope does not oscillate, but remains approximately fixed in space, while it is the ship which oscillates and therefore moves the paper beneath the stationary styli. As the ship rolls, the stylus 26 will be held stationary while the paper being attached to the ship will be moved laterally, resulting in the recording of line 56. Similarly as the ship pitches line 57 will be recorded. At the same time, time indications 62' will be recorded, so that the chart will indicate the amplitude, period and other characteristics of both the roll and the pitch of the ship.

In accordance with the provisions of the patent statutes, I have herein described the principle of operation of my invention, together with the apparatus, which I now consider to represent the best embodiment thereof, and I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a motion recorder for oscillating bodies, a gyroscope, means including a gimbal ring for mounting the same for oscillation about two horizontal axes and for spinning about a third axis, a loop pivotally mounted adjacent said gyroscope on an axis substantially in line with one of said horizontal axes, a slidable connection between said gyroscope and loop permitting free oscillation of the former about the other horizontal axis without turning said loop, a traveling chart, means connected to said gimbal ring to be moved by apparent oscillation of the gyroscope about said last named axis for producing a record on said chart, and a second means connected to said loop to be moved by apparent oscillation of the gyroscope about the axis of the loop, for producing a second record on said chart.

2. A gyroscopic recording instrument as claimed in claim 1 in which the gyroscope is provided with a damping means mounted directly on the same.

3. A recording instrument as claimed in claim 1 having a clock-controlled device adapted to periodically produce a mark upon said chart member.

4. Means for recording the motions of an oscillating body comprising a gyroscope, means for mounting the same for oscillation about two horizontal axes, a traveling surface mounted adjacent thereto, a marker mounted for movement across said surface, an inclined guideway connected to said marker, means for mounting the same for movement at an angle to the direction or travel of said surface, a member engaging said guideway and secured to said gyroscope so that when it is moved about an axis of said gyroscope in the direction of travel of said surface, said marker will be moved across said surface.

In testimony whereof I have affixed my signature.

ELMER A. SPERRY.